United States Patent [19]

Holzmann et al.

[11] Patent Number: 5,129,013

[45] Date of Patent: Jul. 7, 1992

[54] GRAPHICS IMAGE EDITOR

[75] Inventors: Gerard J. Holzmann, Berkeley Heights; Robert C. Pike, Basking Ridge, both of N.J.

[73] Assignee: AT&T Bell Laboratories, Murray Hill, N.J.

[21] Appl. No.: 773,739

[22] Filed: Oct. 9, 1991

Related U.S. Application Data

[63] Continuation of Ser. No. 520,145, May 4, 1990, abandoned, which is a continuation of Ser. No. 107,325, Oct. 13, 1987, abandoned.

[51] Int. Cl.$^5$ ............................................. G06K 9/32
[52] U.S. Cl. .................................... 382/44; 382/54; 395/155; 395/161; 340/747
[58] Field of Search .................. 382/41, 44, 45, 46, 382/49, 54; 340/747; 395/155, 160, 161

[56] References Cited

U.S. PATENT DOCUMENTS

| | | | |
|---|---|---|---|
| 4,286,330 | 8/1981 | Isaacson | 382/49 |
| 4,602,346 | 7/1986 | Kawakami et al. | 382/47 |
| 4,685,070 | 8/1987 | Flinchbaugh | 364/522 |
| 4,761,642 | 8/1988 | Huntzinger | 364/521 |
| 4,764,867 | 8/1988 | Hess | 364/200 |
| 4,928,247 | 5/1990 | Doyle et al. | 364/518 |

OTHER PUBLICATIONS

J. P. Chieze, et al., "Un Systeme Interactif de Traitement D'Images", Congres AFCET-IRIA, Reconaissance des formes et traitement des images, Chatenayk-Malabry, Feb. 21-23, 1978, pp. 836-840.

T. Porter, et al., "Compositing Digital Images", Computer Graphics, vol. 18, No. 3, Jul. 1984, pp. 253-259.

Patent Abstracts of Japan, vol. 12, No. 170 (P-705) [3017], JP-A-62280935 (Fujitsu) May 12, 1987.

"An Image Synthesizer", ACM, vol. 9, No. 3, Ken Perlin, pp. 287-296, 1985.

"Hips: A Unix-Based Image Processing System", *Computer Vision, Graphics and Image Processing*, vol. 25, Landy et al., pp. 331-347, 1984.

"Kandidats: An Interactive Image Processing System", *Computer Graphics and Image Processing*, vol. 8, R. M. Haralick et al., pp. 1-15, 1978.

*Primary Examiner*—Jose Couso
*Attorney, Agent, or Firm*—Gordon E. Nelson; Jerry Herndon

[57] ABSTRACT

An interactive image editor. Editing commands are interactively imputted to a computer by a user to form an image transformation function. The commands define how to alter the pixels of the image and the portions of the image to alter. The editor parses the commands and generates a program for performing the image transformation. The program is then executed, either by interpreting it or by first compiling it on-the-fly. In either case, each affected pixel of the image is transformed in accordance with the command statements.

16 Claims, 13 Drawing Sheets

FIG. 3

```
1:/***    main.c    **********************************************/
2:
3:#include        <stdio.h>
4:#include        <ctype.h>
5:#include        "popi.h"
6:
7:int    parsed[MANY];
8:struct          SRC     src[MANY];
9:short CUROLD=0, CURNEW=1;
10:int   noerr, lexval, prs=0, nsrc=2;
11:char text[256];
12:
13:char *Emalloc();
14:
15:main(argc, argv)
16:       char **argv;
17:{      int i;
18:
19:       src[CUROLD].pix = (unsigned char **)
20:               Emalloc(DEF_SZ * sizeof(unsigned char *));
21:       src[CURNEW].pix = (unsigned char **)
22:               Emalloc(DEF_SZ * sizeof(unsigned char *));
23:
24:       for (i = 0; i < DEF_SZ; i++)
25:       {       src[CUROLD].pix[i] = (unsigned char *)
26:                       Emalloc(DEF_SZ);
27:               src[CURNEW].pix[i] = (unsigned char *)
28:                       Emalloc(DEF_SZ);
29:       }
30:
31:       for (i = 1; i < argc; i++)
32:               nsrc += getpix(&src[nsrc], argv[i]);
33:
34:       do noerr=1; while( parse() );
35:}
36:
```

FIG. 4

```
37:parse()
38:{     extern int lat;        /* look ahead token */
39:
40:      printf("-> ");
41:
42:      while (noerr)
43.      {       switch (lat = lex()) {
44:              case    'q': return 0;
45:              case    '\n': return 1;
46:              case    ';': break;
47:              case    'f': showfiles();
48:                      break;
49:              case    'r': getname();
50:                      if (noerr)
51:                           getpix(&src[CUROLD], text);
52:                      break;
53:              case    'w': getname();
54:                      if (noerr)
55:                           putpix(&src[CUROLD], text);
56:                      break;
57:              case    'a': getname();
58:                      nsrc += getpix(&src[nsrc], text);
59:                      break;
60:              default : transformation();
61:                      if (noerr) run();
62:                      break;
63:      }       }
64:}
65:
```

FIG. 5

```
66:getname()
67:{      int t = lex();
68:
69:       if (t != NAME && t != FNAME && !isalpha(t))
70:               error("expected name, token: %d\n", t);
71:}
72:
73:emit(what)
74:{
75:       if (prs >= MANY)
76:               error("expression too long\n");
77:       parsed[prs++] = what;
78:}
79:
80:error(s, d)
81:      char *s;
82:{
83:       extern int lat;
84:
85:       fprintf(stderr, s, d);
86:       while (lat != '\n')
87:               lat = lex();
88:       noerr = 0;
89:}
90:
91:char *
92:Emalloc(N)
93:{
94:       char *try, *malloc();
95:       if ((try = malloc(N)) == NULL)
96:               error("out of memory\n");
97:       return try;
98:}
```

FIG. 6

```
1:/*** lex.c (lexical analyzer) *************************/
2:
3:#include <stdio.h>
4:#include <ctype.h>
5:#include "popi.h"
6:
7:extern struct SRC  src[MANY];
8:extern short   CUROLD, CURNEW;
9:extern int     nsrc, lexval;
10:extern char   text[];
11:
12:lex()
13:{    int c;
14:
15:     do
16:             c = getchar();
17:     while (c == ' ' || c == '\t');
18:
19:     if (isdigit(c))
20:             c = getvalue(c);
21:     else if (isalpha(c) || c == '_')
22:             c = getstring(c);
23:
24:     switch (c) {
25:     case '*':   c = follow('*', POW, c); break;
26:     case '>':   c = follow('=', GE,  GT); break;
27:     case '<':   c = follow('=', LE,  LT); break;
28:     case '!':   c = follow('=', NE,  c); break;
29:     case '=':   c = follow('=', EQ,  c); break;
30:     case '|':   c = follow('|', OR,  c); break;
31:     case '&':   c = follow('&', AND, c); break;
32:     case '^':   c = XO; break;
33:     case 'Z':   c = VALUE; lexval = 255; break;
34:     case 'Y':   c = VALUE; lexval = DEF_SZ; break;
35:     case 'X':   c = VALUE; lexval = DEF_SZ; break;
36:     default :   break;
37:     }
38:     return c;
39:}
40:
```

FIG. 7

```
41:getvalue(first)
42:{     int c;
43:
44:      lexval = first -'0';
45:      while (isdigit(c = getchar()))
46:              lexval = 10*lexval + c - '0';
47:      pushback(c);
48:      return VALUE;
49:}
50:
51:getstring(first)
52:{     int c = first;
53:      char *str = text;
54:
55:      do {
56:              *str++ = c;
57:              c = getchar();
58:      } while (isalpha(c) || c == '_' || isdigit(c));
59:      *str = '\0';
60:      pushback(c);
61:
62:      if (strcmp(text, "new") == 0) return NEW;
63:      if (strcmp(text, "old") == 0) return OLD;
64:
65:      for (c = 2; c < nsrc; c++)
66:              if (strcmp(src[c].str, text) == 0)
67:              {       lexval = c-1;
68:                      return FNAME;
69:              }
70:      if (strlen(text) > 1)
71:              return NAME;
72:      return first;
73:}
74:
75:follow(tok, ifyes, ifno)
76:{     int c;
77:
78:      if ((c = getchar()) == tok)
79:              return ifyes;
80:      pushback(c);
81:
82:      return ifno;
83:}
84:
85:pushback(c)
86:{
87:      ungetc(c, stdin);
88:}
```

FIG. 8

```
1:/*** expr.c (parser)  ****************************/
2:
3:#include "popi.h"
4:
5:extern int     lexval, nsrc;
6:extern struct SRC     src[MANY];
7:extern short   CUROLD, CURNEW;
8:int            lat;              /* look ahead token */
9:
10:int op[4][7] = {
11:     { '*', '/', '%', 0, 0, 0, 0, },
12:     { '+', '-',  0, 0, 0, 0, 0, },
13:     { GT, GE, LT, LE, EQ, NE, 0, },
14:     { AND, OR, XO,  0, 0, 0, 0, },
15:};
16:
17:expr()
18:{     extern int prs;
19:      extern int parsed[MANY];
20:      int remem1, remem2;
21:
22:      level(3);
23:      if (lat == '?')
24:      {       lat = lex();
25:              emit('?');
26:              remem1 = prs; emit(0);
27:              expr();
28:              expect(':'); emit(':');
29:              remem2 = prs; emit(0);
30:              parsed[remem1] = prs-1;
31:              expr();
32:              parsed[remem2] = prs-1;
33:      }
34:}
35:
36:level(nr)
37:{     int i;
38:      extern int noerr;
39:
40:      if (nr < 0)
41:      {       factor(); return;
42:      }
43:      level(nr-1);
44:      do
45:      {       for (i = 0; op[nr][i]; i++)
46:                      if (lat == op[nr][i])
47:                      {       lat = lex(); level(nr-1);
48:                              emit(op[nr][i]);
49:                              break;
50:                      }
51:      } while (op[nr][i] && noerr);
52:}
53:
```

FIG. 9

```
54:transformation()
55:{
56:       extern int prs;
57:
58:       prs = 0;
59:       if (lat != NEW)
60:       {       expr();
61:               emit('@');
62:               pushback(lat);
63:               return;
64:       }
65:       lat = lex();
66:       if (lat == '[')
67:       {       fileref(CURNEW, LVAL);
68:               expect('='); expr(); emit('=');
69:       } else
70:       {       expect('='); expr(); emit('@');
71:       }
72:       if (lat != '\n' && lat != ';')
73:               error("syntax error, stmnt separator\n");
74:       pushback(lat);
75:}
76:
```

FIG. 11

```
121:fileref(val, tok)
122:{
123:      if (val < 0 || val >= nsrc)
124:              error("file number out of range: %d\n", val);
125:
126:      emit(VALUE);
127:      emit(val);
128:      if (lat == '[')
129:      {       lat = lex();
130:              expr(); expect(',');
131:              expr(); expect(']');    /* [x,y] */
132:      } else
133:      {       emit('x');
134:              emit('y');
135:      }
136:      emit(tok);
137:}
138:
139:expect(t)
140:      int t;
141:{
142:      if (lat == t)
143:              lat = lex();
144:      else
145:              error("error: expected token %d\n", t);
146:}
```

FIG. 10

```
 77:factor()
 78:{    int n;
 79:
 80:     switch (lat) {
 81:     case    '(':       lat = lex();
 82:                        expr();
 83:                        expect(')');
 84:                        break;
 85:     case    '-':       lat = lex();
 86:                        factor();
 87:                        emit(UMIN);
 88:                        break;
 89:     case    '!':       lat = lex();
 90:                        factor();
 91:                        emit('!');
 92:                        break;
 93:     case    OLD:       lat = lex();
 94:                        fileref(CUROLD, RVAL);
 95:                        break;
 96:     case FNAME:        n = lexval;
 97:                        lat = lex();
 98:                        fileref(n+1, RVAL);
 99:                        break;
100:     case    '$':       lat = lex();
101:                        expect(VALUE);
102:                        fileref(lexval+1, RVAL);
103:                        break;
104:     case VALUE:        emit(VALUE);
105:                        emit(lexval);
106:                        lat = lex();
107:                        break;
108:     case 'y':
109:     case 'x':          emit(lat);
110:                        lat = lex();
111:                        break;
112:     default :          error("factor: syntax error\n");
113:     }
114:     if (lat == POW)
115:     {       lat = lex();
116:             factor();
117:             emit(POW);
118:     }
119:}
120:
```

FIG. 12

```
1:/***   run.c   (interpreter)  *******************************/
2:
3:#include      "popi.h"
4:
5:extern int     prs, parsed[MANY];
6:extern struct SRC     src[MANY];
7:extern short   CUROLD, CURNEW;
8:
9:#define dop(OP)        a=*--rr; tr=rr-1; *tr=(*tr OP (long)a)
10:
11:long
12:Pow(a, b)
13:    long a, b;
14:{   double c = (double)a;
15:    double d = (double)b;
16:    double pow();
17:
18:    return (long) pow(c, d);
19:}
20:
21:run()
22:{   long R[MANY];
23:    register long *rr, *tr;
24:    register unsigned char *u, *p;
25:    register int k;
26:    int a, b, c, x, y;
27:
28:    p = src[CURNEW].pix[0];
29:    for (y = 0; y < DEF_SZ; y++, p = src[CURNEW].pix[y])
30:    for (x = 0; x < DEF_SZ; x++, p++)
31:    for (k = 0, rr = R; k < prs; k++)
32:    {      if (parsed[k] == VALUE)
33:           {      *rr++ = (long)parsed[++k];
34:                  continue;
35:           }
36:           if (parsed[k] == '@')
37:           {      *p = (unsigned char) (*--rr);
38:                  continue;
39:           }
```

FIG. 13

```
40:         switch (parsed[k]) {
41:         case  '+': dop(+);   break;
42:         case  '-': dop(-);   break;
43:         case  '*': dop(*);   break;
44:         case  '/': dop(/);   break;
45:         case  '%': dop(%);   break;
46:         case   GT: dop(>);   break;
47:         case   LT: dop(<);   break;
48:         case   GE: dop(>=);  break;
49:         case   LE: dop(<=);  break;
50:         case   EQ: dop(==);  break;
51:         case   NE: dop(!=);  break;
52:         case  AND: dop(&&);  break;
53:         case   OR: dop(||);  break;
54:         case   XO: dop(|);   break;
55:         case  'x': *rr++ = (long)x; break;
56:         case  'y': *rr++ = (long)y; break;
57:         case UMIN: tr = rr-1; *tr = -(*tr); break;
58:         case  '!': tr = rr-1; *tr = !(*tr); break;
59:         case  '=': a = *--rr;
60:                    u = (unsigned char *) *--rr;
61:                    *u = (unsigned char) a;
62:                    break;
63:         case RVAL: a = *--rr;
64:                    b = *--rr;
65:                    tr = rr-1;
66:                    c = *tr;
67:                    *tr = (long) src[c].pix[a][b];
68:                    break;
69:         case LVAL: a = *--rr;
70:                    b = *--rr;
71:                    tr = rr-1;
72:                    c = *tr;
73:                    *tr = (long) &(src[c].pix[a][b]);
74:                    break;
75:         case  POW: a = *--rr;
76:                    *(rr-1) = Pow(*(rr-1),(long)a);
77:                    break;
78:         case  '?': a = *--rr; k++;
79:                    if (!a) k = parsed[k];
80:                    break;
81:         case  ':': k = parsed[k+1]; break;
82:
83:         default  : error("run: unknown operator\n");
84:                    }
85:         }
86:         x = CUROLD; CUROLD = CURNEW; CURNEW = x;
87: }
```

FIG. 14

```
1:/*** io.c      (file handler)     *****************************/
2:
3:#include       <stdio.h>
4:#include       "popi.h"
5:
6:extern struct SRC src[MANY];
7:extern int nsrc;
8:extern char *Emalloc();
9:
10:getpix(into, str)
11:     struct SRC *into;
12:     char *str;
13:{
14:     FILE *fd;
15:     int i;
16:     if ((fd = fopen(str, "r")) == NULL)
17:     {       fprintf(stderr, "cannot open %s\n", str);
18:             return 0;
19:     }
20:
21:     if (into->pix == (unsigned char **) 0)
22:     {       into->pix = (unsigned char **)
23:                     Emalloc(DEF_SZ * sizeof(unsigned char *));
24:             for (i = 0; i < DEF_SZ; i++)
25:                     into->pix[i] = (unsigned char *)
26:                             Emalloc(DEF_SZ);
27:     }
28:     into->str = (char *) Emalloc(strlen(str)+1);
29:
30:     for (i = 0; i < DEF_SZ; i++)
31:             fread(into->pix[i], 1, DEF_SZ, fd);
32:     strcpy(into->str, str);
33:
34:     fclose(fd);
35:     return 1;
36:}
37:
38:putpix(into, str)
39:     struct SRC *into;
40:     char *str;
41:{
42:     FILE *fd;
43:     int i;
44:
45:     if ((fd = fopen(str, "w")) == NULL)
46:     {       fprintf(stderr, "cannot create %s\n", str);
47:             return;
48:     }
49:     for (i = 0; i < DEF_SZ; i++)
50:             fwrite(into->pix[i], 1, DEF_SZ, fd);
51:     fclose(fd);
52:}
53:
```

FIG. 15

```
54:showfiles()
55:{    int n;
56:
57:     if (nsrc == 2)
58:             printf("no files open\n");
59:     else
60:     for (n = 2; n < nsrc; n++)
61:             printf("$%d = %s\n", n-1, src[n].str);
62:}
```

FIG. 16

```
1:/***   popi.h (header file)  ******************************/
2:
3:#define MANY    128
4:#define DEF_SZ          248
5:
6:#define RVAL    257     /* larger than any char token */
7:#define LVAL    258
8:#define FNAME   259
9:#define VALUE   260
10:#define NAME   261
11:#define NEW    262
12:#define OLD    263
13:#define AND    264
14:#define OR     265
15:#define XO     266
16:#define EQ     267
17:#define NE     268
18:#define GT     269
19:#define GE     270
20:#define LT     271
21:#define LE     272
22:#define UMIN   273
23:#define POW    274
24:
25:struct SRC {
26:     unsigned char **pix;    /* pix[y][x] */
27:     char *str;
28:};
```

GRAPHICS IMAGE EDITOR

This application is a continuation of application Ser. No. 07/520,145, filed on May 4, 1990, which in turn is a continuation of application Ser. No. 07/107,325, filed Oct. 13, 1987 now abandoned.

TECHNICAL BACKGROUND

The invention relates to the field of image processing and particularly to the field of computer graphics in which digitized graphic images are transformed by altering the states of the pixels that form the image.

BACKGROUND OF THE INVENTION

The creation and editing of graphics images by the use of hardware or software is well known. A number of available products allow images to be created and stored in computer memory from sources such as video cameras, CCD scanners, digitizers, VCR's, video disc players and the like.

Such stored images are described by a structured set of pixels in which each pixel describes the attributes, such as intensity, color, etc., of a single dot of the image. It is this type of image environment with which the invention is most associated. The need arises to be able to edit digital graphic images of this type irrespective of how the images are created. Heretofore, in general each graphics editing operation that might be performed on an image has been accomplished with special purpose hardware or software. In the software field, for example, typically a library of graphics tools is generated. Each tool provides a tailored type of operation or transformation on a digital image to which it is applied. For example, one tool might rotate an image; another might shrink an image, and still another might generate a negative of an image. If a transformation is desired for which there is no tool, the tool must be coded and added to the library. Robert Haralick et al. describe a system of this type in their paper entitled "KANDIDATS: An Interactive Image Processing System", *Computer Graphics and Image Processing*, 8, 1-15, 1978. Still another of these types of editors is described by Michael Landy et al in "HIPS: A UNIX (TM of AT&T) Based Image Processing System", *Computer Vision, Graphics and Image Processing*, 25, 331-347, 1984. This latter paper provides a software tool CALCPIX to allow easier generation of new transformation tools.

A pixel stream editor (PSE) is described by K. Perlin in "*An Image Synthesizer*", ACM, Vol. 9, No. 3, 1985, pp 287-296. The PSE is a powerful graphics editing tool which allows a user to specify changes to be made to an image on a pixel basis in terms of the attributes of a pixel and predefined mathematical functions. For example, one attribute of each pixel might be whether or not the pixel resides on the surface of an object represented in the image. The surface texture of an object may be modified by applying a white noise generating function "noise ()" in conjunction with other functions to the pixels having the surface attribute. The PSE is limited, however, to pixel operations involving only the attributes of the pixel being processed at any given time.

In view of the expanding importance of graphics in industry and the limited state of the image editing art, it is highly desirable to have a more flexible means of image editing.

SUMMARY OF THE INVENTION

An advance in the graphics and imaging art is achieved in a method of controlling a computer to edit graphics images. A graphics image is composed of an ordered set of pixels. Editing of the image is accomplished by altering the states of some or all of the pixels in real time. The computer system interactively receives as input an image transformation function in the form of one or more command statements composed according to a set of syntactic rules. The function defines the affected pixels of the image to be altered and the relationships for altering the affected pixels. The relationships may include dependencies on the states of one or more other pixels of the image. The system, under control of the software automatically generates a sequence of program steps to perform the transformation function.

In a preferred embodiment the generated program steps are automatically executed in real time after their generation. In one alternative of the preferred embodiment, the generated program steps are interpreted and performed individually for each pixel of the image. In a second alternative, the generated program steps are complied on-the-fly into a machine language program and the machine language program is automatically executed for each pixel of the image. There may, of course, be other alternatives within the scope of the invention. The dependencies which define the new pixel states of an altered image may include dependencies on other pixels of the image being altered, as well as dependencies on pixel states of images stored in other files.

The sequence of program steps is generated by parsing the input command statements and forming a parse string of token values as the sequence of program steps in the interpreted embodiment, and a parse tree in the compiled embodiment in which the tokens are represented by nodes in the parse tree. Each token value represents either a number or an operator to be applied to one or more of the numbers. In the interpreted alternative, the token values in the parse string are sequentially interpreted by means of a stack interpreter for each pixel of the image. In the complied alternative, the parse tree is compiled into a machine language program which is executed for each pixel of the image.

BRIEF DESCRIPTION OF THE DRAWING

FIGS. 3 through 16 disclose the source code, written in the C programming language, of an interpreter embodiment of the invention, and specifically, FIGS. 3 through 5 show the beginning procedure main() and related subprocedures;

FIGS. 6 and 7 show a lexical analyzer procedure;

FIGS. 8 through 11 show a parser for the input commands and related procedures;

FIGS. 12 and 13 show an interpreter for executing a generated transformation program;

FIGS. 14 and 15 show file input and output procedures, and

FIG. 16 shows a header file popi.h which defines constants, etc. for the above procedures.

GENERAL DESCRIPTION

Figure 1:
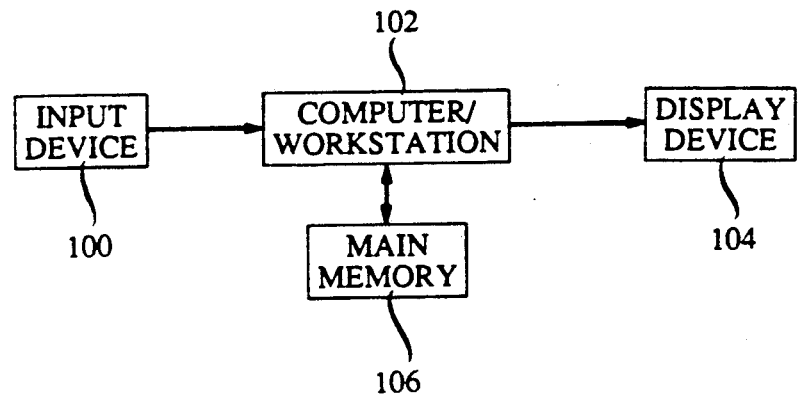
FIG. 1 shows an illustrative computer or workstation system which might be used to practice the invention.

This section is a very brief tutorial of how a user interfaces with the editor to effect image transformations. It is intended as an aid to reader understanding. A more detailed tutorial is given in an article "PICO-A Picture Editor", Gerard Holzmann, *AT&T Technical Journal*, March/April 1987, pp. 2-13. This article is incorporated herein in its entirety by reference.

To avoid writing a special-purpose program for each different type of transformation one might wish, the editor uses a command language that is powerful enough to define almost any type of transformation. The editor parses user commands, translates them into a program, and executes the program to perform the transformation. The command language may include control flow statements, such as conditional pixel transformations and program execution loops. The command language is simple, with defaults defining the most common choices. The capability of performing program execution loops is not shown in the interpreted embodiment for simplicity.

The interpreter version of the editor recognizes, among other operators, the following mathematical, relational and logical operators:

Add +
Subtract −
Multiply *
Divide /
GT Greater than
LT Less than
GE Greater than or equal to
LE Less than
EQ Equal to
NE Not equal to
AND Logical "and"
OR Logical "or"
XO Logical "exclusive or"

In terms of such operators which are by way of example only, a transformation to create a negative of an image with brightness values in the range O . . . Z, for example, can be defined in one statement:

$$new = Z - old \qquad (1)$$

where "old" refers to an image and "new" refers to the image after a transformation has been applied. This transformation is independent of the size of the image or whether it is in color or in black and white. Each pixel state of "new" depends only on the corresponding pixel state of "old".

The expression above is expanded in the editor into a small program, which would be similar in function to the following statement written in the C programming language:

$$for(y=0;y<Y;y++)for(x=0;x<X;x++)$$

$$new[y*X+x] = Z - old[y*X+x];$$

The upper left corner of the image is at the origin of the screen coordinate system, with positive x pointing to the right and positive y pointing down. X and Y are predefined constants that specify the width and height of the image edit buffer in pixels. Similarly, Z is a predefined constant that defines a maximum brightness value.

Rotating an image by 90 degrees requires a slightly more complicated statement:

$$new[x,y] = old[y,X - x]$$

Note that a pixel of the altered image "new" now depends on the state of a pixel of "old" other than the same corresponding pixel. Similarly, the command:

$$new[x,y] = old[y,x]$$

transposes an image by swapping x and y coordinates for the edited image.

The transformation statements, such as above, may be based on pixel coordinates, variables, old pixel values, or arbitrary arithmetic combinations of these. The above example statements describe more or less standard edit operations with a single expression. For transformations that can not easily be cast into simple arithmetic expressions, the user may define more explicit editing procedures and programs. This is described in detail in the above-mentioned *AT&T Technical Journal* article.

An average of two images "image1" and "image2" can be expressed as:

$$new = (\$image1 + \$image2)/2.$$

where $image1, for example, refers to the contents of image 1 as a whole.
Or similarly, $$new = (\$image1 * \$image2)/Z$$

Both of these are unconditional transformations which apply to all pixels. Conditional expressions are allowed and take the form of $$(condition)?(iftrue):(iffalse).$$

For example, the expression $$new = (x < 256)?(image1 + image2)/2 : Z-image2$$

defines an average of two images for all pixels with an x coordinate less than 256 (i.e., the left-most 256 columns of the pixel array) and a negative of one of the images for all other pixels.

An image "image1" can be slowly faded into another image "image2" by a nested conditional transformation such as:

$$new = (x < X/3)?\$image1:(x > X*2/3)\text{-}$$
$$?\$image2:3 *((x-X/3)*\$image1+(X*2/3-x\text{-})*\$image2)/X$$

With the above illustrative examples as aids to the reader, a detailed description of the editor is now given.

DETAILED DESCRIPTION

The image editor may be used to control a system such as shown in FIG. 1. A user has access to an input device 100, a keyboard for example, to input commands to a computer 102. Computer 102 might be minicomputer or mainframe computer, for example, a VAX 711, a 3B20 computer commercially available from American Telephone & Telegraph Company, Incorporated, or it could be virtually any type of general purpose or desktop computer. A graphics display device 104 is used by computer 102 to display image files and to show the results of edit operations performed by the image editor. The image editor resides in a main memory 106 from which it is read and loaded into the internal memory of computer 102 for controlling the operations of the computer when the editor is to be executed. Alternatively, the system of FIG. 1 could be embodied in other forms of systems, such as a workstation type of arrangement which performs the functions of the editor with circuitry or programs contained in read-only-memories (ROMs).

Figure 2:
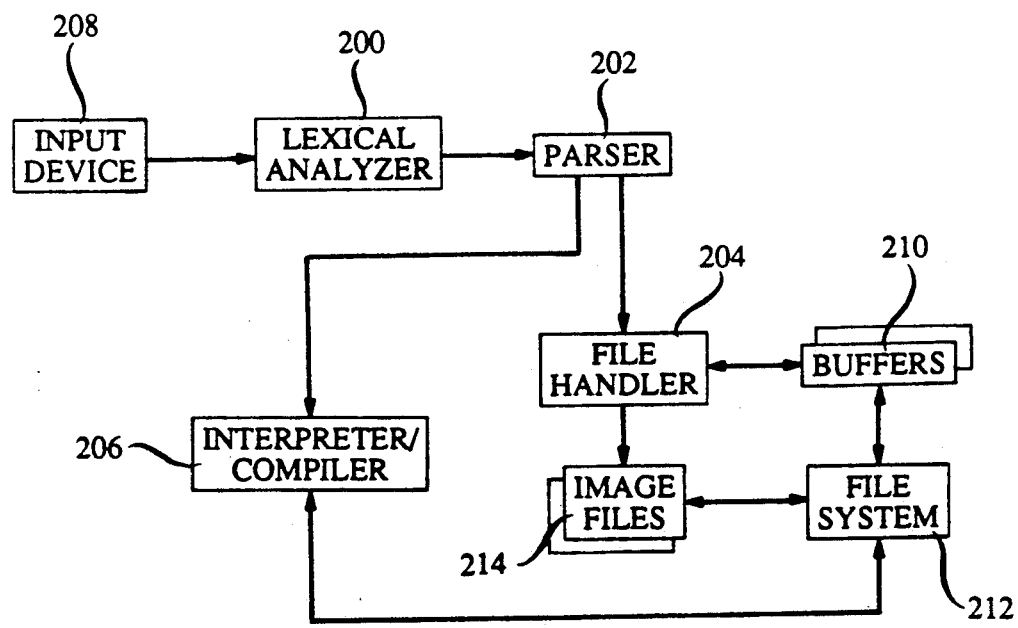
FIG. 2 shows an illustrative organization of an image editor according to the principles of the invention described herein.

An illustrative block structure of the editor is shown in FIG. 2. It comprises a lexical analyzer 200, a parser 202, a file handler 204, and an interpreter or compiler 206. Characters typed by a user at an input device 208 are processed by the lexical analyzer 200 and the results are passed to the parser 202. The parser then takes the appropriate action. For example, an input character "r" might signify a command to read an existing image file from a file system 212 in main memory into a buffer 210 in internal memory for editing or as a source to be used in editing another image. In this event, the following characters up to a newline character (carriage return or linefeed) would signify the filename of the desired image. The file handler, which controls the reading and writing of image files between temporary buffers 210 in internal memory and the file system 212, is eventually invoked to perform this file loading action. On the other hand, characters inputted to the lexical analyzer may form an editing command.

The lexical analyzer 200 scans the user input for predefined character sequences. These sequences are replaced with single character tokens which are passed to the parser 202. An eight character sequence such as "new=xy", for instance, is passed as a sequence of five tokens (NEW,=,x,POW, and y) from the lexical analyzer to the parser. Full capitals are used here to indicate single tokens; that is, that a predefined input string, such as "new", is replaced with a single character token NEW. The parser recognizes the above token sequence as an assignment command from the assignment operator "=". It remembers the first token NEW as the assignment destination and parses the last three tokens as an expression. It then builds a program to perform the assignment (transformation) operation for affected pixels in the image being edited. In this example, if 206 is an interpreter, the generated program executed by the interpreter calculates a new value xy for each pixel of the image in the edit buffer, where ** means exponentiation. Every pixel of the edited image is affected by default because no command statement is present to otherwise limit the scope of the exponentiation command. If 206 is a compiler, the generated program is automatically compiled on-the-fly and the compiled program performs the above operation.

The interpreter embodiment of the editor is described in detail herein. The functionality of the compiler embodiment is described in the referenced *AT&T Technical Journal* article. The significant difference between the two embodiments is that the interpreter portion of the code to be described herein, is replaced with an on-the-fly compiler. In view of the teaching herein, this modification is conventional and can be accomplished by any artisan of compiler art.

The source code of the editor, illustratively written in the C programming language, is shown in FIGS. 3 through 16. The C programming language is well known and is described in any number of readily available publications. Only the major aspects of the source code will be described in detail, since any skilled art worker may readily understand how the editor operates from a careful reading of the code and an understanding of the C programming language.

Every C program begins with a main( ) procedure. The main( ) procedure for the editor is shown in FIG. 3. Main( ) initializes the editor for subsequent operations. Main( ), and other editor procedures to be discussed, use a header file popi.h, shown in FIG. 16, to define a number of constants. A data structure "src" is also defined in popi.h at lines 25 through 27 as a two dimensional character structure. Members of this data structure are used to store the digital image files internally in the computer. Referring again to FIG. 3, line 8 of main( ) uses the definition of SRC in popi.h to establish a plurality of internal buffers of number MANY, where MANY is illustratively defined in popi.h as 128. As mentioned above, each member of src[MANY] is used to store image data as needed as data sources from an image file in the file system. However, the first two members, src[0] and src[1] are used as edit buffers. The format of an image data structure is illustratively one byte per pixel in this disclosed embodiment and contains DEF_SZ pixels per scanline and DEF_SZ scanlines per image, where DEF_SZ is a constant value 248, also defined in popi.h. Obviously, other structures may be used, such as multiple bytes per pixel for color images and different image sizes.

When a file is initially read for editing, it is placed in one of the two buffers src[0] or src[1]. In the actual source code, the selected buffer is addressed as src[CUROLD]. After an editing operation, the edited file is placed in the remaining one of the edit buffers src[0] or src[1]. In the source code, this buffer is referred to as src[CURNEW]). Src[CUROLD] and src[CURNEW] are established at lines 19 through 22 of main( ). After src[CURNEW] is loaded with an edited image file, the contents of src[CURNEW] and src[CUROLD] are swapped so that the newly edited file is treated now as an old file. This allows for exiting in incremental stages. It also makes it easy to perform a one-level "undo" operation.

When a user initially runs the editor, the command for doing so may include a list of image files. If so, the code at lines 31 and 32 read the image files into as many of the buffers src[2], src[3] . . . as required. The contents of these buffers may be referenced in input commands by preceding the name of the file contained in a buffer with a "$", as in "new=$image2", which will read "image2" from its internal buffer into edit buffer src[CURNEW]. Next, line 34 calls a procedure parse( ).

Parse( ), which begins at line 37 of FIG. 3, parses commands inputted by a user. Once initiated, parse( ) runs until a quit command is inputted by the user or an error in operation occurs. Parse( ) comprises primarily a C language switch statement beginning at line 43 of FIG. 4. A switch statement, in turn, consists of a series of case statements. On each execution of the switch statement, one of the case statements is executed depending upon a match of an argument in the case statement with an input parameter to the switch statement. Here, the input parameter to the switch statement is the contents of a variable "lat" (look ahead token), which contains a token such as discussed earlier and which is initialized at line 43 of FIG. 4 by the procedure lex( ). Lex( ) is discussed below. Briefly, however, lex( ) returns a single character token, which it is recalled is a character inputted by a user or a special character replacing a predefined string of characters inputted by a user. Parse( ) examines the token to determine if it is a file handling or control character. This occurs at lines 44 through 59 of FIG. 4. For this embodiment, file handling and control commands are:

q quit
f list image filenames
r read an image file into an edit buffer
w write a permanent image file from an edit buffer
a read a file into a nonedit buffer src[2] . . .

The meanings of these commands are sufficiently obvious and the disclosed code for performing them is sufficiently clear that no detailed further explanation is required.

If the token retrieved at line 43 does not represent a file handling or control command, then the token must be the beginning of or part of a transformation expression to be applied to the image stored in edit buffer src[CUROLD]. In this event, line 60 of FIG. 4 executes a procedure called transformation( ) to gather and parse the expression.

Before proceeding with a discussion of procedure transformation( ), a description of the lexical analyzer lex( ) should be helpful.

Lex( ) is shown in FIGS. 6 and 7. It is called at various places of the parser shown in FIGS. 8 through 11 and returns a token and possibly a character string and-/or a value in variables "text" and "lexval", respectively. Tokens that may be returned include NEW and OLD, and special operators that consist of more than one character, such as '>=' (greater than or equal to), '!=' (not equal), and '&&' (logical AND). Lex( ) determines when the name of an image file is inputted and it converts numeric characters into integers. Every character that is not recognized by the lexical analyzer as part of a special predefined character sequence is passed untouched to the parser with a code that is equal to its ascii value. Thus, in the command new [x,y]=old [y,x−1], the x,y and the y,x−1 are passed intact as expressions to the parser. It is the interpreter, eventually acting on a parse string which includes these expressions, that performs the statements of the expressions and provides random access to any pixel in the image.

The next character from a user is obtained at line 16 and assigned to variable "c". Line 19 determines if the character is a number by using procedure isdigit( ). If not, line 21 determines if the character is an alphabetic character a-z or A-Z. Isdigit( ) and isalpha( ) are standard C library routines. They return a nonzero result in "c" when the argument is a digit or a letter, respectively. If a new character is a digit, a procedure getvalue( ) at line 41 of FIG. 7 is executed. Getvalue( ) scans additional inputted characters as long as they are digits and computes the value of the digit string. This value is stored in variable "lexval" for subsequent use. When done, getvalue( ) returns a token VALUE in "c" and the value of the numeric character string in "lexval" for parsing. The returned tokens and variable contents are placed in a parse string "parsed". The last input character that was not a digit is pushed back into the character input stream at line 47 for subsequent processing. The final sequence of characters in the parse string represents the generated program to be performed to transform a image in the interpreter embodiment and the source for compilation in the compiler embodiment.

If a character is a letter at line 21 of FIG. 6, procedure getstring( ) scans additional inputted characters to determine if a predefined character sequence is present. If so, getstring( ) returns in "c" a token representing the predefined string. Such possible tokens in this illustrative embodiment are NEW for "new", OLD for "old", NAME for an undefined string of characters and FNAME if the string represents an open image filename. If the present input character is not found to be part of a predefined string, the present character is returned in "c" as the present token for parsing.

A switch statement at line 24 of FIG. 6 now parses the present token in "c", which may be VALUE from getvalue( ), NAME or FNAME from getstring( ) or a user inputted character. We use the case statement at line 25 as one parsing example. This statement looks for a "raise to a power" operation, which is represented by two consecutive "*". It uses a procedure follow( ) at line 75 of FIG. 7 to do this. If the present token is "*", the "c=follow( )" statement at line 25 of FIG. 6 sets "c" to a new token POW if the following input character is also a "*". Otherwise, the present value of "c" is retained. Lines 26 through 31 of FIG. 6 perform similar parsing operations for other arithmetic and logical operators.

Similar opertions are performed by the code at LINES 32-35. Line 32 recognizes an "exclusive or" operator. Lines 33 through 35 recognize predefined inputted constants. Specifically, the constants Z, X and Y represent a maximum brightness for a pixel, and the maximum width and height of an image, respectively.

The parsed token now in "c" is returned to the calling procedure at line 38. However, the last user input character read at line 78 of FIG. 7 by follow( ) before return to the calling procedure must be pushed back into the user input character stream for later use. The procedure pushback(c) at line 85 uses a C library procedure ungetc(c,stdin) to accomplish this, where "c" contains the character and stdin refers to the standard character input from the user keyboard.

The tokens returned from the lexical analyzer can have two different attributes. Numeric tokens have a value attribute stored in an integer variable "lexval". Tokens representing single non-numeric characters or predefined character sequences have a character string attribute that is stored in an array "text". Tokens of type FNAME have both a value and a character string attribute. The FNAME token refers to an open image file. Its string attribute gives the file name, and its value attribute is an index to a buffer 210 in which the file contents have been A few more C library routines are used in the lexical analyzer, which are summarized here for completeness. Strlen(str) (line 70) returns the number of characters in a user input string; strcmp(str1,str2) returns zero if two strings str1 and str2 are identical.

The procedure transformation( ) in FIG. 9 is part of an overall parser procedure expr( ) beginning on FIG. 8. The part of the parser in FIG. 8 is described below at the appropriate time.

It is recalled that transformation( ) is called from line 60 of main( ) in FIG. 4. Transformation( ) expects to see an input character sequence, such as "NEW[x,y]=command". Such an input sequence reaches transformation( ) as a token NEW followed by a character '[', a number for the x index, a token ',', another number for the y index, a token '=' and a final string of tokens representing an expression for the values to be assigned to NEW[x,y]. The code in FIG. 9 allows for certain parts of this sequence to be missing. It fills in any missing parts with default values. The symbol '@', for instance, in this code represents a default destination NEW for the assignment if "new" is not inputted by the user. In this event, the default destination is stored by the parser with the symbol '@'. This is done at lines 59 through 63 of FIG. 9. This symbol '@' signals the interpreter, discussed below, to assign each pixel value calculated as a result of execution of a transformation to src[CURNEW]. As a further default, if the index "[x,y]" to array NEW is missing, as in "new=expression", the parser assumes a default index of [x,y]. At line 65, the next input character is fetched from lex( ) and assigned to variable "lat". This character is examined at lines 66 to 73 of FIG. 9 and the next expected character is established as a result. Procedure expect(token) at lines 68 and 70 verify that the look ahead token matches the expected value and then reads in the next token from the lexical analyzer.

The main portion of the parser, expr( ), in FIG. 8 is now executed from lines 68 or 70 of FIG. 9 to parse the present character and look for the next expected character. Lines 11 through 14 of FIG. 8 establish four levels of arithmetic and logical operator priority, respectively. Lines 22 through 32 of FIG. 8 parse a conditional input command of the form "condition?iftrue:iffalse" if a conditional expression is encountered, where "condition" is the expression to be evaluated, and "iftrue" and "iffalse" are operations to be performed if the condition is true or false, respectively. A procedure, level( ), at lines 36 through 49 places as many tokens as can be parsed at the present stage in reverse polish notation and pushes the so arranged tokens onto a stack, discussed below, to form the parse string. The pushing onto the stack is accomplished by the emit procedure shown in FIG. 5 at line 73. Emit( ) is called by the parser at line 48 of FIG. 8, for example. Establishment of operator precedence must be taken into account during the parsing by level( ). Level( ) works straightforwardly. It tries to parse the highest precedence operators first. At the highest level precedence level, it tries to find a factor, such as a number or a variable, using procedure factor( ) in FIG. 10. In addition, a factor can be an expression enclosed in parentheses, it can be another factor preceded by a minus sign (unary minus) or a logical negation. It can be a symbolic or a numeric file reference, a value, a Cartesian coordinate, or a factor raised to some other factor with a power operator. A symbolic file reference is a string of characters defining the file name. A numeric reference is illustratively a "$" followed by a number identifying one of the internal image buffers. At the lower precedence levels, factor( ) checks for the appropriate operators in the precedence table shown in lines 12 through 14 of FIG. 8.

The procedure fileref( ) in FIG. 11 is used by the parser to decode image file references from a user. It further checks that the requested image buffer exists. It then adds a series of tokens to the parse string that encode the file reference and pixel addresses in the image file. The encoded file reference and pixel addresses provide random access to the pixels of that file during execution of the transformation program.

As briefly mentioned above, as the parse string is generated, it is stored in a stack with special operators such as '@' and '='. In reverse polish notation the expression NEW=xy becomes 'x,y, POW, @', where POW stands for "power" and represents the "power" operator "" in the command. In other words, the operators, such as POW, follow the operands to which they apply, instead of residing between them. This format greatly simplifies the design of the interpreter. A value is encoded in the parse string by the token VALUE followed by a number representing the value.

When the present parsing is completed as far as it can go by lines 36 through 49, program execution falls through to procedure transformation( ) at line 54 to continue with the parsing. When user input is completed for a command, a newline character is found by the code at line 72. Alternatively, a user may terminate a command with a ";" which is also treated as a newline character. The latter allows a user to concatenate a string of commands. In either event, the parser automatically terminates and returns control to the calling procedure. In the example at hand, this is to line 61 of main( ) in FIG. 4. At this point the interpreter procedure run( ) in FIG. 12 is called.

The interpreter is illustratively designed as a stack machine. It maintains a pointer "rr" to the stack containing the parse string. The stack pointer "rr" points to the first free slot on the stack. The value on top of the stack is at position "rr"−1. During interpretation of the parse string, values and variables that are encountered are placed (pushed) onto the stack, operators and functions cause an unloading (popping) of values from the top of the stack and a pushing of the result of application of the operator or function onto the stack. At the end of each run of the interpreter the stack should be empty. A macro dop(OP) is defined at line 9 of FIG. 11 for the frequently occurring operation that pops two values from the stack, applies an operation to them and pushes the result back. The dop macro is used for all binary arithmetic and boolean operations.

The interpreter run( ) executes the program on the stack for every pixel of the image in file src[CUROLD]. Three nested loops are setup at lines 29 through 31 to accomplish this. The code in lines 32 through 35 executes the parse string program on the stack on each pixel by loading and unloading the stack tokens and performing the appropriate operations. The result of execution of the program on each pixel is the new value of the pixel being pushed onto the stack. This value on the stack is placed in the image file by the code at lines 36 through 38 and the program is reexecuted for the next pixel.

The statement at line 32 reads the next token from the parse string in "parsed". If the token is VALUE, meaning that the next token in the parse string is a number, then line 33 reads that number from the parse string and places it on top of the stack "rr". If an assignment is reached in the parse string, signified by a token "@", lines 36 to 38 place the value now on top of the stack, which is usually a result of executing the parse string, into the image file. If neither of the last two events occur, the switch statement beginning at line 40 of FIG. 12 is executed. Each case statement under "switch" at line 40 deals with the necessary stack operations for the remaining types of tokens that may be found in the parse string. These tokens are:

1. '+' Add
2. '−' Subtract
3. '*' Multiply
4. '/' Divide
5. '%' Modulo
6. GT Greater than
7. LT Less than
8. GE Greater than or equal to
11. NE Not equal to
12. AND Logical "and"

13. OR Logical "or"
14. XO Logical "exclusive or"
15. 'x' Image "x" coordinate
16. 'y' Image "y" coordinate
17. UMIN Unary minus
18. '!' Logical "not"
19. '=' Assignment
20. RVAL Source for a value assignment
21. LVAL Destination for an assignment
22. ** Raise to a power
23. '?' Conditional expression
24. ':' Action separator in conditional expression A character above enclosed in single quotes identifies the character as a literal token.

We will describe the operations performed by the '+' and '=' case statements at lines 41 and 59 as explanatory examples, with the understanding that the operations of the remaining case statements then become obvious to a skilled art worker. If token '+' is read from the parse string, line 41 is executed where the macro dop( ) is called. Execution of dop( ) pops the next two tokens from the stack, adds their values and pushes the result back onto the stack. On the other hand, execution of the assignment case statement at line 59 for the parse string token "=", results in modifying a pixel value in an image file. In this case, the next value on top of the stack is a pixel value to be stored in the image file. The value following the top value on the stack is an image file address in src[CURNEW] at which the pixel value is to be stored.

When the parse string has been executed on every pixel of the edit buffer src[CUROLD] and the result placed in src[CURNEW], then the edit buffers src[CURNEW] and src[CUROLD] are interchanged at line 86 and program control is returned to main( ) for the next user command or transformation.

FIGS. 14 and 15 contain the source code for the file handling procedure io( ). Three procedures are contained in io( ). Getpix( ) at line 10 is called to read an image file into a buffer in response to user commands "r" (read) and "a" (attach). Putpix( ) at line 38 is likewise called for writing a buffer into a permanent file. Showfiles( ) at line 54 of FIG. 15 prints the image file names associated with any open buffers.

It is understood that the above described arrangements are merely illustrative of the principles of the invention and that other arrangements may be devised by those skilled in the art without departing from the spirit and scope of the invention as set forth in the claims.

What is claimed is:

1. A method of editing at least one source image stored in a computer system to produce a destination image, the images being represented by ordered sets of pixels and the method comprising the steps of:
   commencing execution of an interactive editing program in the computer system; and
   the interactive editing program operating at least once during the execution to perform the steps of
   receiving an editing command from an input-output device, the editing command including a sequence of at least one image editing operator which represents an image editing operation and is syntactically distinct from a routine name and at least one source operand which represents one of the source images; and
   responding to the editing command by applying the image editing operations specified by the operators to pixels of the source images specified by the source operands to produce pixels of the destination image.

2. The method set forth in claim 1 further including the step of:
   setting one of the source operands to specify the destination image produced by preceding steps of receiving an editing command and responding to the editing command prior to executing the step of receiving an input command.

3. The method set forth in claim 1 wherein:
   the sequence further includes a destination operand specifying the destination image; and
   the step of responding to the editing command produces the destination image specified by the destination operand.

4. The method set forth in claim 3 wherein:
   the operators include a pixel selection operator used with an operand for selecting a pixel from the image specified by the operand and a pixel operator for operating on a selected pixel; and
   the step of responding to the editing command applies the pixel operator to the pixels of the source images specified by the pixel selection operators used with the source operands and produces therefrom the pixels of the destination image specified by the pixel selection operator used with the destination operand.

5. The method set forth in claim 4 wherein:
   when an operand is used without a pixel selection operator, the step of responding to the editing command applies the pixel operator to all of the pixels in the image specified by the operand.

6. The method set forth in claim 4 wherein:
   each pixel has one or more attributes;
   the operators include an attribute selection operator used with an operand for selecting an attribute from the pixels selected by the pixel selection operator of the image specified by the operand and a pixel operator for operating on the selected attribute of a pixel; and
   the step of responding to the editing command applies the pixel operator to the attributes specified by the attribute selection operators used with the source operands of those pixels of the source images specified by the pixel selection operators used with the source operands and produces therefrom the attributes specified by the attribute selection operators used with the destination operand of those pixels of the destination image specified by the pixel selection operator used with the destination operand.

7. The method set forth in claim 6 wherein:
   when an operand is used without an attribute selection operator, the step of responding to the editing command applies to all of the attributes in the pixels selected by the pixel selection operator of the image specified by the operand; and
   when an operand is used without a pixel selection operator, the step of responding to the editing command applies the pixel operator to all of the attributes selected by the attribute selection operator in all of the pixels of the image specified by the operand.

8. The method set forth in claim 3 wherein:
   each pixel has one or more attributes;

the operators include an attribute selection operator used with an operand for selecting an attribute from the pixels for the image specified by the operand and a pixel operator for operating on the selected attribute of a pixel; and the step of responding to the editing command applies the pixel operator to the attributes of the source images' pixels specified by the attribute selection operator used with the source operands and produces therefrom the attributes of the destination image's pixels specified by the attribute selection operator used with the destination operand.

9. The method set forth in claim 8 wherein:

when an operand is used without an attribute selection operator, the step of responding to the editing command applies to all of the attributes in the pixels of the image specified by the operand.

10. The method set forth in claim 1 wherein:

the operators include a pixel operator for operating on selected pixels of the image specified by a source operand and a conditional operator for specifying a condition for selecting the pixels; and the step of responding to the editing command applies the pixel operator to the pixels of the source images which satisfy the condition specified by the conditional operator and produces therefrom the pixels of the destination image.

11. The method set forth in claim 1 further including the step of:

displaying the destination image produced in response to the editing command on an output device.

12. The method set forth in claim 1 wherein:

the step of responding to the editing command includes the steps of:

compiling the editing command to produce executable code applying the image editing operations specified by the operators to pixels of the source images specified by the source operands; and executing the executable code to produce pixels of the destination image.

13. Apparatus for editing at least one source image to produce a destination image comprising:

storage means for storing the images as ordered sets of pixels;

command receiving means for interactively receiving an editing command from an input device, the editing command including a sequence of at least one image editing operator which represents an image editing operation and is syntactically distinct from a routine name and at least one source operand which represents one of the source images; and processing means coupled to the storage means and the command receiving means for responding to the editing command by reading pixels of the source images specified by the source operands from the storage means, applying the image editing operations specified by the operators to the pixels read from the storage means to produce pixels of the destination image, and writing the produced pixels to the storage means.

14. The apparatus as set forth in claim 13 further comprising:

display means coupled to the processing means for displaying the destination image upon production of the destination image by the processing means.

15. The apparatus as set forth in claim 13 wherein:

the processing means further comprises parser means for producing an executable sequence of operations specifying the image editing operations from the editing command and means for performing the image editing operations by interpreting the executable sequence of operations.

16. The apparatus as set forth in claim 13 wherein:

the processing means further comprises:

parser means for producing a sequence of operations specifying the image editing operations from the editing command;

compiler means for receiving the sequence of operations and producing a sequence of executable instructions therefrom; and means for performing the image editing operations by executing the executable sequence of instructions.

* * * * *